United States Patent
Jin et al.

(10) Patent No.: US 9,955,213 B2
(45) Date of Patent: Apr. 24, 2018

(54) METHODS AND SYSTEMS FOR MANAGING A LOCAL DIGITAL VIDEO RECORDING SYSTEM

(71) Applicant: Verizon Patent and Licensing Inc., Arlington, VA (US)

(72) Inventors: Zhiying Jin, Lexington, MA (US); Wei Xia, Sudbury, MA (US); Sandeep G. Rathi, Woburn, MA (US); Samuel T. Scott, III, Saratoga, CA (US); Johannes P. Schmidt, Los Altos Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 403 days.

(21) Appl. No.: 14/701,270

(22) Filed: Apr. 30, 2015

(65) Prior Publication Data

US 2016/0323633 A1 Nov. 3, 2016

(51) Int. Cl.
| | |
|---|---|
| *H04N 21/433* | (2011.01) |
| *H04N 21/41* | (2011.01) |
| *H04N 21/258* | (2011.01) |
| *H04N 21/2747* | (2011.01) |
| *H04N 21/458* | (2011.01) |
| *H04N 21/462* | (2011.01) |
| *H04N 21/6543* | (2011.01) |
| *H04N 21/658* | (2011.01) |

(52) U.S. Cl.
CPC ... *H04N 21/4334* (2013.01); *H04N 21/25875* (2013.01); *H04N 21/2747* (2013.01); *H04N 21/4135* (2013.01); *H04N 21/4583* (2013.01); *H04N 21/4622* (2013.01); *H04N 21/6543* (2013.01); *H04N 21/6581* (2013.01)

(58) Field of Classification Search
CPC .......... H04N 21/4135; H04N 21/4334; H04N 21/2387; H04N 21/25875; H04N 21/2747; H04N 21/4583; H04N 21/4622; H04N 21/6543; H04N 21/6581
See application file for complete search history.

(56) References Cited

U.S. PATENT DOCUMENTS

| | | | | |
|---|---|---|---|---|
| 2003/0190149 A1* | 10/2003 | Chang | .................... | H04N 5/782 386/298 |
| 2007/0009235 A1* | 1/2007 | Walters | .............. | H04N 21/6581 386/278 |
| 2009/0217332 A1* | 8/2009 | Hindle | .................... | H04N 5/782 725/109 |
| 2010/0061708 A1* | 3/2010 | Barton | .................... | H04N 5/765 386/241 |

(Continued)

Primary Examiner — Gelek W Topgyal

(57) ABSTRACT

An exemplary web services provider system remote from and communicatively coupled to a local digital video recording ("DVR") system by way of a network detects an input command provided by a user and representative of a request for the local DVR system to perform a DVR operation with respect to a media program provided by a television service, identifies, in response to the request, a status of the media program, determines, based on the identified status of the media program, an optimal manner in which to perform the DVR operation, and directs the local DVR system to perform the DVR operation in accordance with the optimal manner. Corresponding systems and methods are also described.

20 Claims, 11 Drawing Sheets

(56) References Cited

U.S. PATENT DOCUMENTS

| | | | |
|---|---|---|---|
| 2012/0054804 A1* | 3/2012 | Howcroft | H04N 5/44513 725/58 |
| 2012/0204215 A1* | 8/2012 | Hayashi | H04N 21/23106 725/88 |
| 2012/0224834 A1* | 9/2012 | Chen | H04N 5/765 386/293 |
| 2014/0270712 A1* | 9/2014 | Bennett | H04N 21/4583 386/292 |

* cited by examiner

METHODS AND SYSTEMS FOR MANAGING A LOCAL DIGITAL VIDEO RECORDING SYSTEM

BACKGROUND INFORMATION

Digital video recording ("DVR") systems allow users to record media content programs (e.g., television programs, etc.) and then view or otherwise experience the recorded media content programs. For example, a user may use a DVR system to schedule a recording of a particular television program, after which the DVR system may record the television program and allow the user to play back the recorded television program in a time-shifted manner.

Conventional DVR systems are managed locally. For example, a set-top box device with DVR functionality may receive input commands directly from a user (e.g., by way of a remote control device) and perform DVR operations, such as recording and playing back media programs, in response to the input commands. Unfortunately, this may not result in the set-top box device performing the DVR operations in an optimal manner. For example, the user may provide a command for the set-top box device to record a particular media program scheduled for presentation during a particular time period in the future. A network outage may unfortunately occur during the scheduled time period and prevent the set-top box from recording the entire media program. The user may subsequently provide another command for the set-top box device to play back the recorded media program. Because the set-top box device is managed locally, the set-top box device may not be aware that the entire media program was not recorded and may therefore play back the partially recorded media program instead of using a different source (e.g., a catch up television service) to play back the media program.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for managing a local DVR system are described herein. As will be illustrated below, the local DVR system may include a media player device (e.g., a set-top box device) and a local DVR device separate from and communicatively coupled to the media player device. The local DVR device may be configured to record media programs for play back by way of the local media player device. The methods and systems described herein may facilitate efficient management of how the local DVR system records and plays back media programs.

In some embodiments, a web services provider system remote from and communicatively coupled to the local DVR system by way of a network (e.g., the Internet) is configured to manage the local DVR system. For example, the web services provider system may detect an input command provided by a user and representative of a request for the local DVR system to perform a DVR operation with respect to a media program provided by a television service. In response to the request, the web services provider system may identify a status of the media program and determine, based on the identified status, an optimal manner in which to perform the DVR operation. The web services provider system may then direct the local DVR system to perform the DVR operation in accordance with the optimal manner. Various examples of the local DVR system performing a DVR operation in accordance with an optimal manner will be provided herein.

By using web services to manage how DVR operations are performed by a local DVR system (as opposed to the local DVR system itself managing how it performs the DVR operations), the methods and systems described herein may facilitate selective use by the local DVR system of a network-based catch up television service to record and/or play back media programs, ensure that a user of the local DVR system is authorized to interact with the local DVR system, conserve network and local DVR system resources, and/or provide various other benefits that will be made apparent herein.

Figure 1:
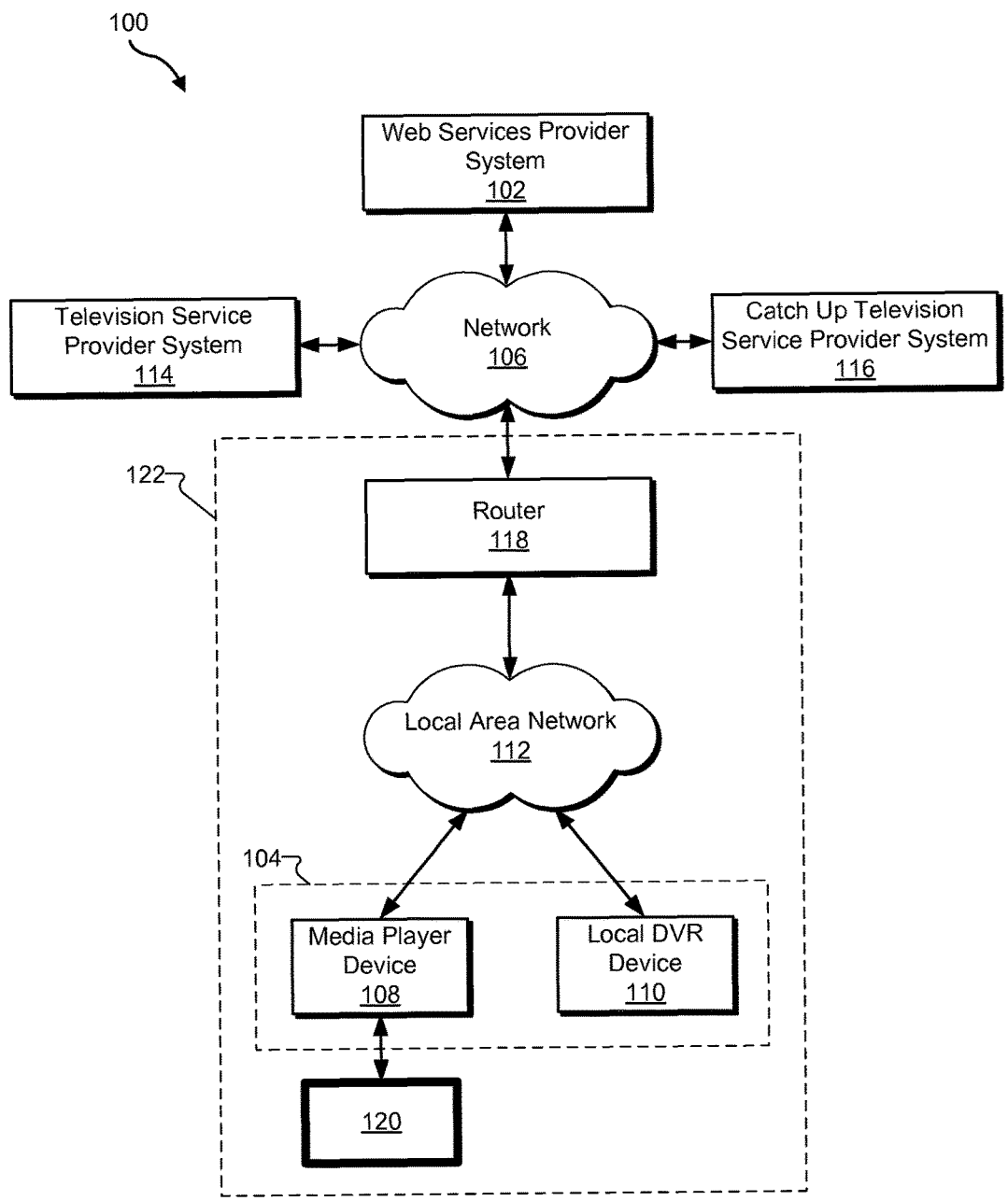
FIG. 1 shows an exemplary configuration in which a web services provider system is remote from and communicatively coupled to a local DVR system by way of a network according to principles described herein.

FIG. 1 shows an exemplary configuration 100 in which a web services provider system 102 is remote from and communicatively coupled to a local DVR system 104 by way of a network 106. Local DVR system 104 may include a media player device 108 and a local DVR device 110 communicatively coupled to each other by way of a local area network 112. As shown, configuration 100 further includes a television service provider system 114, a catch up television service provider system 116, a router 118, and a display screen 120 connected to media player device 108. As shown, local DVR system 104, router 118, and display screen 120 may be located within a user premises 122 (e.g., a home, business, or other geographic area) associated with a user.

As shown, web services provider system 102, television service provider system 114, and catch up television service provider system 116 may be communicatively coupled to network 106. Network 106 may include one or more wide area networks (e.g., the Internet), wireless communication networks, mobile telephone networks (e.g., cellular telephone networks), closed media networks, open media networks, subscriber television networks, and/or any other networks capable of carrying data (e.g., media streams) and/or communications signals. Local DVR system 104 may be connected to network 106 by way of router 118 and local area network 112 and thereby communicate with web services provider system 102, television service provider system 114, and/or catch up television service provider system 116. Local area network 112 may include any suitable network that connects network-enabled devices within user premises 122. For example, local area network 112 may include a wired and/or wireless network provided by router 118.

Web services provider system 102, television service provider system 114, catch up television service provider system 116, router 118, media player device 108, and local DVR device 110 may communicate using any communication platforms and technologies suitable for transporting data (e.g., media streams) and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS"), wireless communication technologies, Internet communication technologies, media streaming technologies, media download technologies, and other suitable communications technologies.

Web services provider system 102 may provide a web service that manages local DVR system 104. The web service may include any suitable network-based service capable of performing the management operations described herein. Web services provider system 102 may be associated with (e.g., maintained and/or provided by) any suitable entity (e.g., a television service provider that is also associated with television service provider system 114, a third party entity not associated with television service provider system 114, a network service provider, etc.). Exemplary components of web services provider system 102 will be described below.

Television service provider system 114 may provide a television service for access by one or more users (e.g., a user associated with user premises 122). The television service may include a subscription television service and/or any other television service that provides access to television programming. For example, television service provider system 114 may transmit media streams (e.g., Internet Protocol television ("IPTV") streams) to local DVR system 104 by way of network 106. Television service provider system 114 may be associated with (e.g., maintained and/or provided by) a television service provider and/or any other entity as may serve a particular implementation.

Catch up television service provider system 116 may provide a catch up television service that may be utilized by local DVR system 104. As used herein, a "catch up television service" refers to a network-based service that automatically records all television programming broadcast or otherwise provided by way of one or more television channels. The television programming may be available for subsequent network access by users of the catch up television service for a predetermined number of days (e.g., three days) after it is recorded. Catch up television service provider system 116 may be associated with (e.g., maintained and/or provided by) any suitable entity (e.g., a television service provider that is also associated with television service provider system 114, a third party entity not associated with television service provider system 114, a network service provider, etc.). In some alternative implementations, catch up television service provider system 116 is not included in configuration 100.

Web services provider system 102, television service provider system 114, and catch up television service provider system 116 are shown in FIG. 1 to be separate systems for illustrative purposes only. It will be recognized that two or more of web services provider system 102, television service provider system 114, and catch up television service provider system 116 may be integrated into a single system and/or associated with the same entity.

Router 118 may include any suitable network communication device that may be located within user premises 122 and that may distribute media streams provided by television service provider system 114 to media player device 108 and local DVR device 110. Router 118 may include, for example, a broadband home router configured to receive IPTV streams from television service provider system 114 via network 106 and distribute the IPTV streams to media player device 108 and local DVR device 110 via local area network 112.

Local DVR system 104 may include any type of local system configured to record and play back media programs provided by a television service. For example, local DVR system 104 may include an IPTV processing system configured to receive and record IPTV streams provided by an IPTV service.

Media player device 108 may include one or more computing devices configured to receive a media stream and present the media stream by displaying media content included in the media stream on display screen 120. For example, media player device 108 may include a set-top box device, a computer, a tablet computer, a smart phone device, a gaming console, and/or any other type of computing device capable of receiving and presenting media streams. In some examples, media player device 108 may be IP-based (i.e., media player device 108 may be configured to receive and present IPTV streams). As will be described below, a media player device 108 may not have its own DVR storage capabilities. A single media player device 108 is shown to be included in local DVR system 104 for illustrative purposes only. It will be recognized that local DVR system 104 may alternatively include a plurality of media player devices.

Display screen 120 may be configured to display media content included in media streams received and processed by media player device 108. Display screen 120 may be separate from and communicatively connected to media player device 108. For example, a display screen 120 may include a television or a computer monitor separate from and connected to a set-top box device. Alternatively, a display screen 120 may be integrated into media player device 108. For example, a display screen 120 may include a screen that is a part of a tablet computer.

Local DVR device 110 may include any suitable computing device or combination of computing devices configured to receive and record media streams received by any of the devices included in local DVR system 104. In this manner, local DVR device 110 may provide DVR functionality to media player device 108, even if media player device 108 does not have its own DVR storage capabilities. For example, a user of media player device 108 may provide a request for media player device 108 to play back a media program recorded by local DVR device 110. In response to the request, web services provider system 102 may direct local DVR device 110 to transmit a media stream that includes the recorded media program to media player device 108 for playback by media player device 108.

Figure 2:
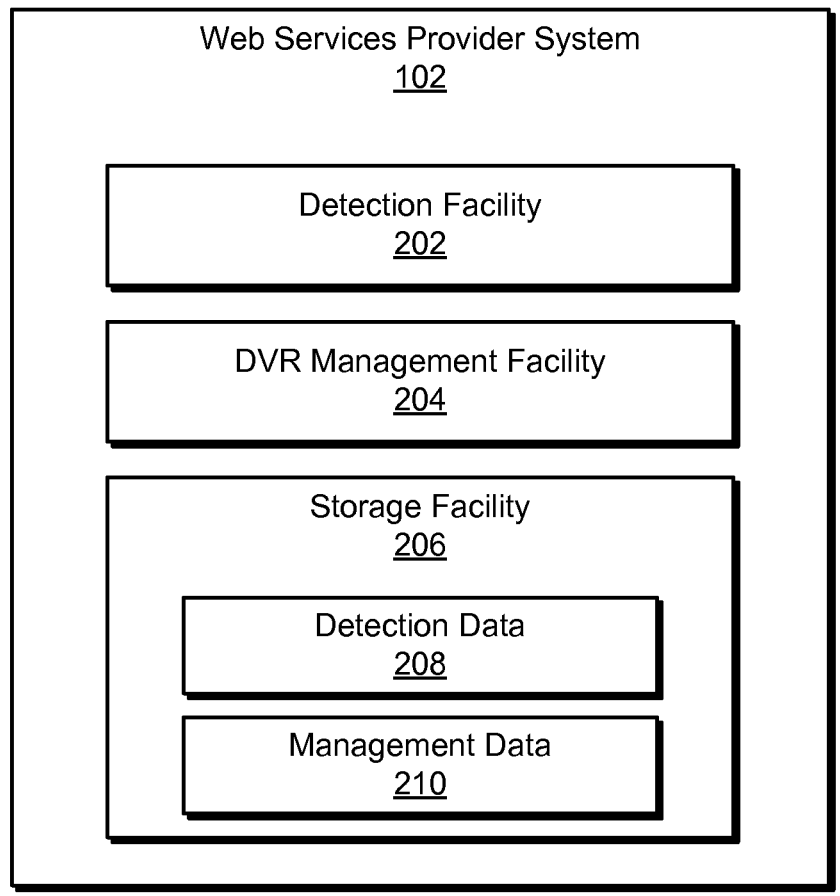
FIG. 2 illustrates various components of a web services provider system according to principles described herein.

FIG. 2 illustrates various components of web services provider system 102. As shown, web services provider system 102 may include, without limitation, a detection facility 202, a DVR management facility 204, and a storage facility 206 selectively and communicatively coupled to one another. It will be recognized that although facilities 202-206 are shown to be separate facilities in FIG. 2, any of facilities 202-206 may be combined into fewer facilities, such as into a single facility, or divided into more facilities as may serve a particular implementation. Additionally or alternatively, one or more of the facilities 202-206 may be omitted from and external to web services provider system 102 in other implementations. For example, storage facility 206 may be external of and communicatively coupled to web services provider system 102 in certain alternative implementations. Facilities 202-206 of web services provider system 102 may include or be otherwise implemented by one or more computing devices specifically configured to perform one or more of the operations described herein. In such implementations, web services provider system 102 may be referred to as a computer-implemented web services provider system 102.

Storage facility 206 may store detection data 208 generated and/or used by detection facility 202 and management data 210 generated and/or used by management facility 204. Storage facility 206 may store additional or alternative data as may serve a particular implementation.

Data stored by storage facility 206 may be accessed by web services provider system 102 from any suitable source, including a source internal or external to web services provider system 102. Storage facility 206 may permanently or temporarily store data. In certain examples, web services provider system 102 may access certain data from a source external to web services provider system 102 and temporarily store the data in storage facility 206 for use by detection facility 202 and/or management facility 204. In certain examples, data generated by detection facility 202 and/or management facility 204 may be stored permanently or temporarily to storage facility 206.

Detection facility 202 may detect an input command provided by a user and representative of a request for a local DVR system (e.g., local DVR system 104) to perform a DVR operation with respect to a media program provided by a television service. As used herein, a "DVR operation" refers to a recording operation, a playback operation, a delete operation, and/or any other suitable operation as may serve a particular implementation. For example, the request may include a request for a local DVR device included in the local DVR system to record the media program. As another example, the request may include a request for a media player device included in the local DVR system to play back the media program.

Detection facility 202 may detect the input command provided by the user and representative of the request for the local DVR system to perform the DVR operation in any suitable manner.

For example, detection facility 202 may detect the input command by receiving the input command from the media player device 108 or the local DVR device 110. To illustrate, a user may provide the input command by using a remote control device to transmit the input command to the media player device 108. The media player device 110 may relay or otherwise transmit the input command to detection facility 202 by way of local area network 112 and network 106 without performing the DVR operation represented by the input command.

As another example, detection facility 202 may detect the input command by receiving the input command directly from a remote control device and/or any other computing device not included in local DVR system 104. To illustrate, a user may provide the input command by utilizing a remote control device. The remote control device may be configured to transmit the input command directly to web services provider system 102 (e.g., by way of networks 112 and 106) while bypassing local DVR system 104. Detection facility 202 may detect the input command by receiving the input command transmitted from the remote control device. It will be recognized that the input command may alternatively be provided by an application executed by a mobile device utilized by the user, a web-based application accessed by way of a computing device, and/or any other source as may serve a particular implementation.

DVR management facility 204 may perform various DVR management operations. For example, in response to detection facility 202 detecting the input command representative of the request for the local DVR system to perform the DVR operation with respect to the media program provided by the television service, DVR management facility 204 may identify a status of the media program. As used herein, a "status" of a media program may refer to a presentation state of the media program, a recording state of the media program, an availability of the media program from one or more sources, and/or any other status of the media program as may serve a particular implementation.

To illustrate, DVR management facility 204 may identify a status of the media program by determining that a media stream that includes the media program is available to the local DVR system when an input command representative of a recording request is provided by the user (e.g., the media program is being broadcast, streamed, or otherwise provided by the television service when the input command is provided by the user).

As another example, DVR management facility 204 may identify a status of the media program by determining that a media stream that includes the media program will not be available to the local DVR system until a scheduled time that is subsequent to an input command representative of a recording request being provided by the user (e.g., the media program will be broadcast, streamed, or otherwise provided at some point in the future compared to when the input command is provided by the user).

As another example, DVR management facility 204 may identify a status of the media program by identifying a particular channel that will carry the media program, a time at which the media program is scheduled to be broadcast or otherwise made available, and/or any other factor that affects how the media program will be made available to the local DVR system.

As another example, DVR management facility 204 may identify a status of the media program by determining that the media program is already being recorded during a live transmission of the media program by more than a predetermined threshold number of DVR devices when an input command representative of a recording request is provided by the user. For example, DVR management facility 204 may determine that a relatively popular media program (e.g., the Super Bowl) is being recorded by a relatively high number of DVR devices when the input command is provided by the user.

As another example, DVR management facility 204 may identify a status of the media program by determining that the media program has already been recorded by the local DVR device when an input command representative of a play back request is provided by the user.

As another example, DVR management facility 204 may identify a status of the media program by determining that the media program has not yet been recorded by the local DVR device and that the media program is available from a catch up television service when an input command representative of a play back request is provided by the user.

DVR management facility 204 may identify any of the above-described statuses in any suitable manner. For example, DVR management facility 204 may determine the status of the media program by accessing program guide data, metadata associated with the media program, data representative of a recording history of the local DVR device, catch up television service data, and/or any other data as may serve a particular implementation.

DVR management facility 204 may determine, based on the identified status of the media program, an optimal manner in which to perform the DVR operation. DVR management facility 204 may then direct the local DVR system to perform the DVR operation in accordance with the optimal manner. Various examples of these functions will be described below.

In some examples, DVR management facility 204 may authenticate the user prior to directing the local DVR system to perform a DVR operation. In this manner, DVR management facility 204 may ensure that the user is authorized to interact with the local DVR system before allowing the local DVR system to perform a DVR operation.

DVR management facility 204 may authenticate a user in any suitable manner. For example, in response to detecting an input command provided by the user and representative of a request for local DVR system 104 to perform a DVR operation with respect to a media program provided by a television service, DVR management facility 204 may authenticate the user by determining an identity of the user and verifying that the user is authorized to interact with local DVR system 104.

DVR management facility 204 may determine an identity of the user in any suitable manner. For example, DVR management facility 204 may detect that a mobile device is located within the vicinity of the media player device 108 and/or display screen 120 when the user provides the input command, identify a user profile associated with the mobile device, and use the user profile to determine the identity of the user.

Figure 3:
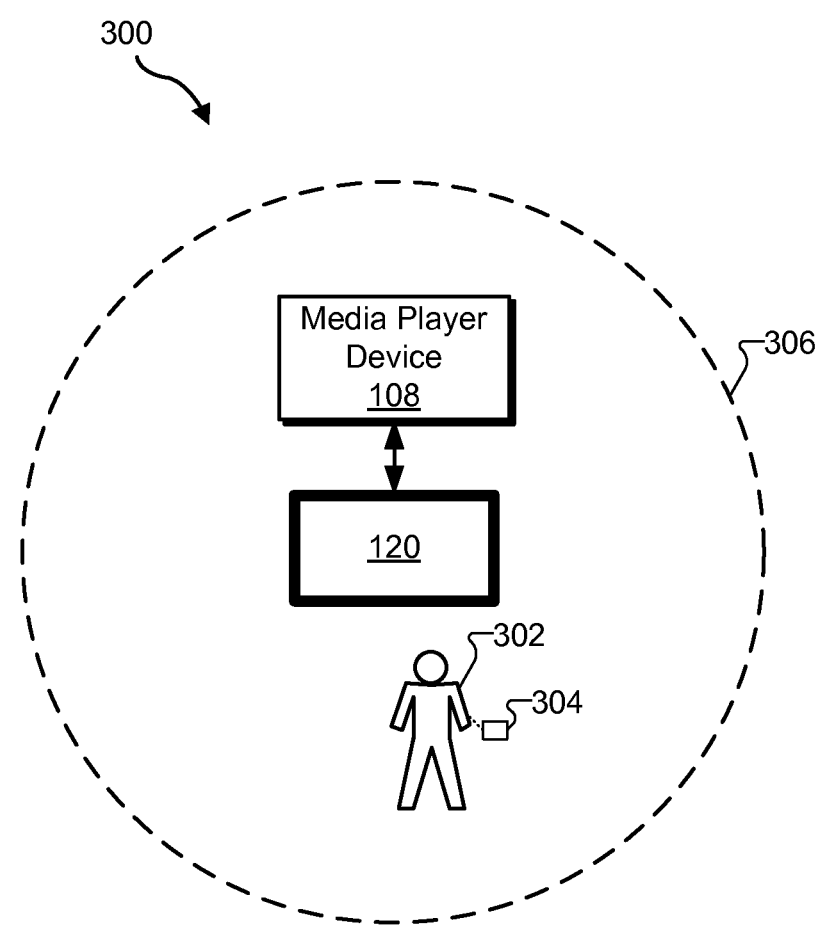
FIG. 3 illustrates an exemplary scenario in which a user carries a mobile device into a vicinity of a media player device according to principles described herein.

To illustrate, FIG. 3 illustrates an exemplary scenario 300 in which a user 302 carries a mobile device 304 into a vicinity 306 of media player device 108 and display screen 120. Mobile device 304 may include a tablet computer, a mobile phone, and/or any other mobile computing device as may serve a particular implementation. Vicinity 306 may include a user-defined geographic area, a network footprint (e.g., a vicinity defined by a wireless range of router 118), and/or any other suitable area as may serve a particular implementation. As such, DVR management facility 204 may detect that mobile device 304 is within vicinity 306 in any suitable manner. For example, DVR management facility 204 may use global positioning system ("GPS") data to determine that mobile device 304 is located within a geographic vicinity of media player device 108 and/or display screen 120. As another example, DVR management facility 204 may determine that mobile device 304 is located within vicinity 306 by determining that mobile device 304 is connected to the same local area network 112 as media player device 108.

In response to determining that mobile device 304 is within vicinity 306, DVR management facility 204 may identify a user profile associated with mobile device 304. This may be done in any suitable manner. For example, DVR management facility 204 may detect an identifier of mobile device 304 and query a database of mobile device records (e.g., records maintained by a wireless service provider) for the identifier in order to identify a user profile associated with mobile device 304. The user profile may then be used to determine the identity of user 302 (e.g., by accessing the same mobile device records).

DVR management facility 204 may additionally or alternatively determine the identity of the user by determining that the input command provided by the user is provided by way of a mobile device, identifying a user profile associated with the mobile device, and using the user profile to determine the identity of the user.

To illustrate, a user may use a remote control application on his or her mobile phone to provide the input command, and, in response, identify a user profile associated with the mobile device. For example, DVR management facility 204 may identify a user account logged in to the remote control application and/or into any other application being executed by the mobile phone. The user account may then be used to determine the identity of the user.

As another example, DVR management facility 204 may determine the identity of the user by acquiring biometric data associated with the user and using the biometric data to determine the identity of the user. For example, DVR management facility 204 may use one or more sensors, cameras, and/or other devices to acquire facial recognition data, fingerprint data, voice recognition data, and/or any other type of biometric data associated with the user. The acquired biometric data may be used in any suitable way to determine the identity of the user.

As another example, DVR management facility 204 may determine the identity of the user by identifying a user account that is currently logged in to media player device 108, local DVR device 110, and/or the television service when the input command is provided by the user.

DVR management facility 204 may use the identity of the user to determine that the user is authorized to interact with local DVR system 104 in any suitable manner. For example, DVR management facility 204 may use the identity of the user to identify a user profile associated with local DVR system 104 and/or the television service and determine that the user profile is authorized to interact with local DVR system 104.

Various examples of the methods and systems described herein will now be described in connection with FIGS. 4-8.

Figure 4:
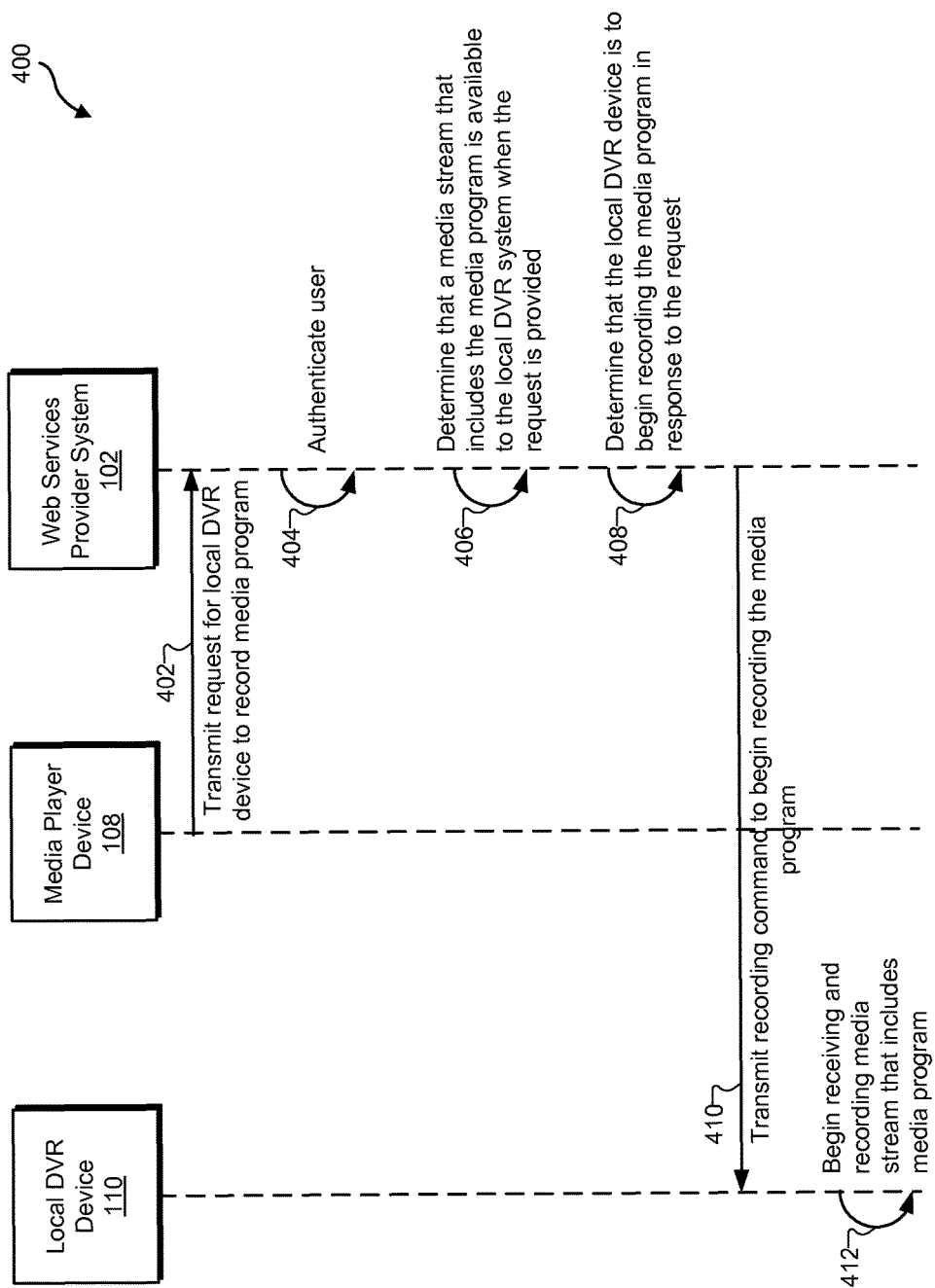
FIGS. 4-8 show exemplary sequence diagrams according to principles described herein.

FIG. 4 shows an exemplary sequence diagram 400 that illustrates a scenario in which a user provides an input command representative of a request for local DVR device 110 included in local DVR system 104 to record a media program provided by a television service. In this example, the request is received by media player device 108, which transmits the request to web services provider system 102 (step 402). It will be recognized that web services provider system 102 may alternatively detect the request in any other suitable manner.

In step 404, web services provider system 102 authenticates the user in response to receiving the request transmitted in step 402. Web services provider system 102 may authenticate the user in any of the ways described herein.

In step 406, web services provider system 102 determines that a media stream that includes the media program is available to local DVR system 104 when the input command representative of the request is provided by the user. For example, web services provider system 102 may determine that the media program is being broadcast when the input command representative of the request is provided by the user. If local DVR system 104 is implemented by IPTV-enabled devices, web services provider system 102 may determine that an IPTV stream that includes data representative of the media program is available to local DVR system 104 when the input command representative of the request is provided by the user. Web services provider system 102 may determine that the media stream is available by accessing program guide data and/or in any other way as may serve a particular implementation.

In step 408, web services provider system 102 identifies an optimal manner in which to record the media program by determining, based on the determination made in step 406 that a media stream that includes the media program is available to local DVR system 104 when the input command representative of the request is provided by the user, that local DVR device 110 is to begin recording the media program in response to the request. Step 408 may be performed in any suitable manner.

In step 410, web services provider system 102 transmits a recording command to local DVR device 110 for local DVR device 110 to begin (e.g., immediately begin) recording the media program. Step 410 may be performed in any suitable manner.

In step 412 and in response to receiving the recording command, local DVR device 110 begins receiving and recording the media stream that includes the media program. For example, local DVR device 110 may tune to a channel that carries the media stream and/or otherwise begin receiving and recording the media stream as may serve a particular implementation.

Figure 5:
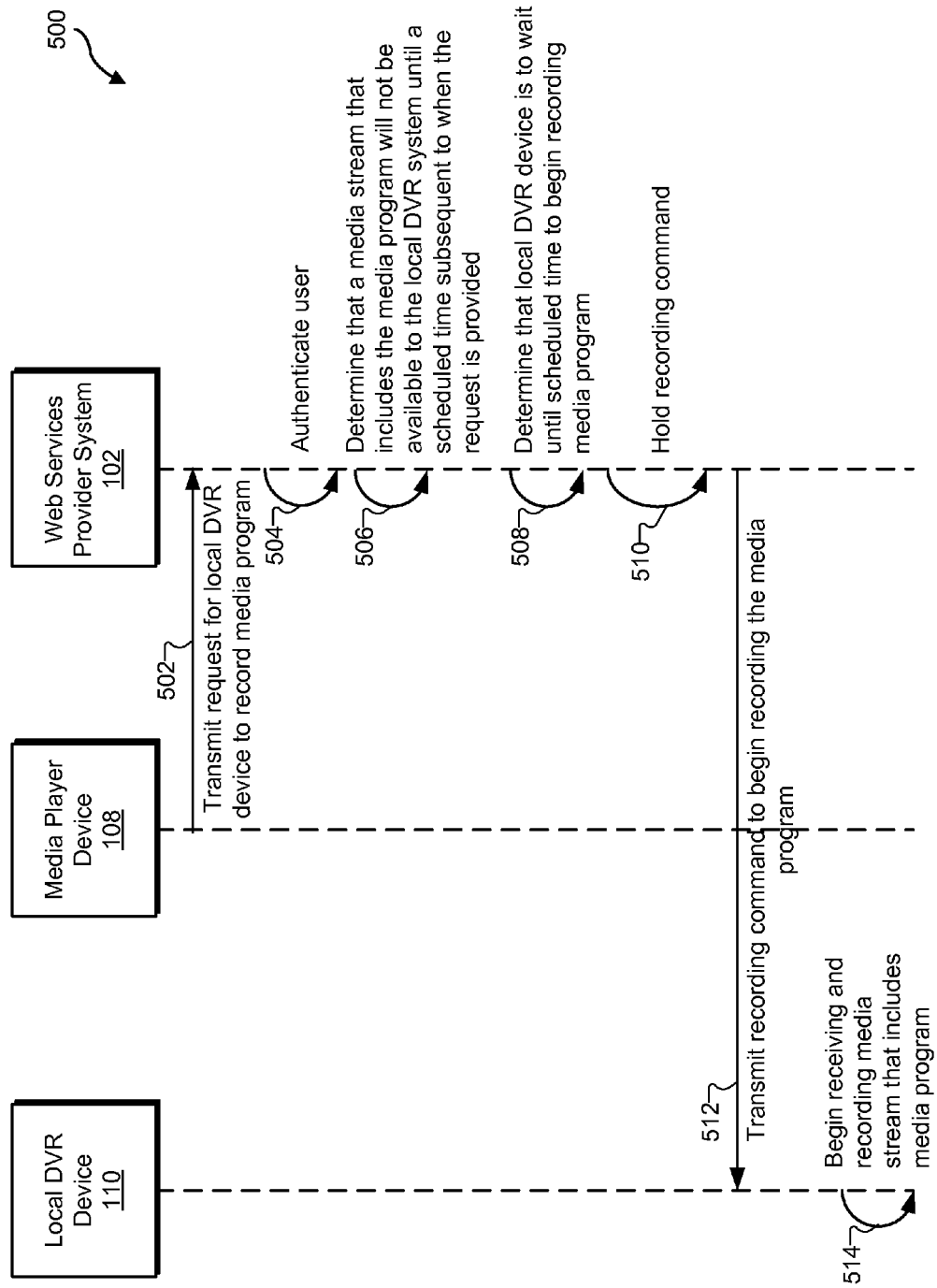

FIG. 5 shows another exemplary sequence diagram 500 that illustrates a scenario in which a user provides an input command representative of a request for local DVR device 110 included in local DVR system 104 to record a media program provided by a television service. In this example, the request is received by media player device 108, which transmits the request to web services provider system 102 (step 502). It will be recognized that web services provider system 102 may alternatively detect the request in any other suitable manner.

In step 504, web services provider system 102 authenticates the user in response to receiving the request transmitted in step 502. Web services provider system 102 may authenticate the user in any of the ways described herein.

In step 506, web services provider system 102 determines that a media stream that includes the media program will not be available to local DVR system 104 until a scheduled time that is subsequent to the input command being provided by the user. For example, the user may provide the input command on a Monday, and the media program may not be broadcast or otherwise made available until the following Friday. Web services provider system 102 may make this determination by accessing program guide data and/or in any other way as may serve a particular implementation.

In step 508, web services provider system 102 identifies an optimal manner in which to record the media program by determining, based on the determination made in step 506 that the media stream will not be available until the scheduled time, that local DVR device 110 is to wait until the scheduled time to begin recording the media program. However, instead of immediately providing a recording command to local DVR device 110, web services provider system 102 holds the recording command (i.e., abstains from transmitting the recording command to local DVR system 110) until a point in time that temporally precedes and is within a predetermined amount of time of the scheduled time (step 510). For example, web services provider system 102 may abstain from transmitting the recording command to local DVR device 110 until two seconds (or any other suitable amount of time) before the media program is scheduled to air or otherwise be presented.

While web services provider system 102 holds the recording command, web services provider system 102 may monitor for a change in the status of the media program. For example, web services provider system 102 may monitor for and detect a change in the scheduled time, a change in the channel that is going to carry the media program, a change in the scheduled duration of the media program, and/or a change in any other aspect of the media program as may serve a particular implementation. If a change in the status of the media program is detected, web services provider system 102 may modify the recording command to reflect the change in the status prior to transmitting the recording command to local DVR device 110.

To illustrate, while web services provider system 102 monitors for a change in status of the media program, the user may schedule a recording for an additional media program scheduled to be available (e.g., scheduled to be broadcast, streamed, or otherwise provided by the television service) at the same time that the media program is scheduled to be available. This may create a recording conflict for local DVR device 110 if local DVR device 110 does not have the resources needed to simultaneously record both media programs. Web services provider system 102 may detect this recording conflict, and, in response, identify a different time that the media program will be available and that does not conflict with the scheduled recording of the additional media program. Web services provider system 102 may then modify the recording command that will be sent to local DVR device 110 with data that directs local DVR device 110 to begin recording the media program at the different time instead of at the originally scheduled time.

As another example, while web services provider system 102 monitors for a change in status of the media program, the television service may change the scheduled time that the media program is to be made available. Web services provider system 102 may detect this change and update the recording command with data that directs local DVR device 110 to begin recording the media program at the changed scheduled time.

Returning to sequence diagram 500, in step 512 and at the predetermined point in time that temporally precedes the scheduled time, web services provider system 102 transmits a recording command to local DVR device 110 for local DVR device 110 to begin recording the media program. Step 510 may be performed in any suitable manner. For example, web services provider system 102 may transmit a recording command to local DVR device 110 for local DVR device 110 to immediately begin recording the media program or for local DVR device 110 to begin recording the media program at the scheduled time.

In step 514 and in response to receiving the recording command, local DVR device 110 begins receiving and recording the media stream that includes the media program. For example, local DVR device 110 may tune to a channel that carries the media stream and/or otherwise begin receiving and recording the media stream as may serve a particular implementation.

Figure 6:
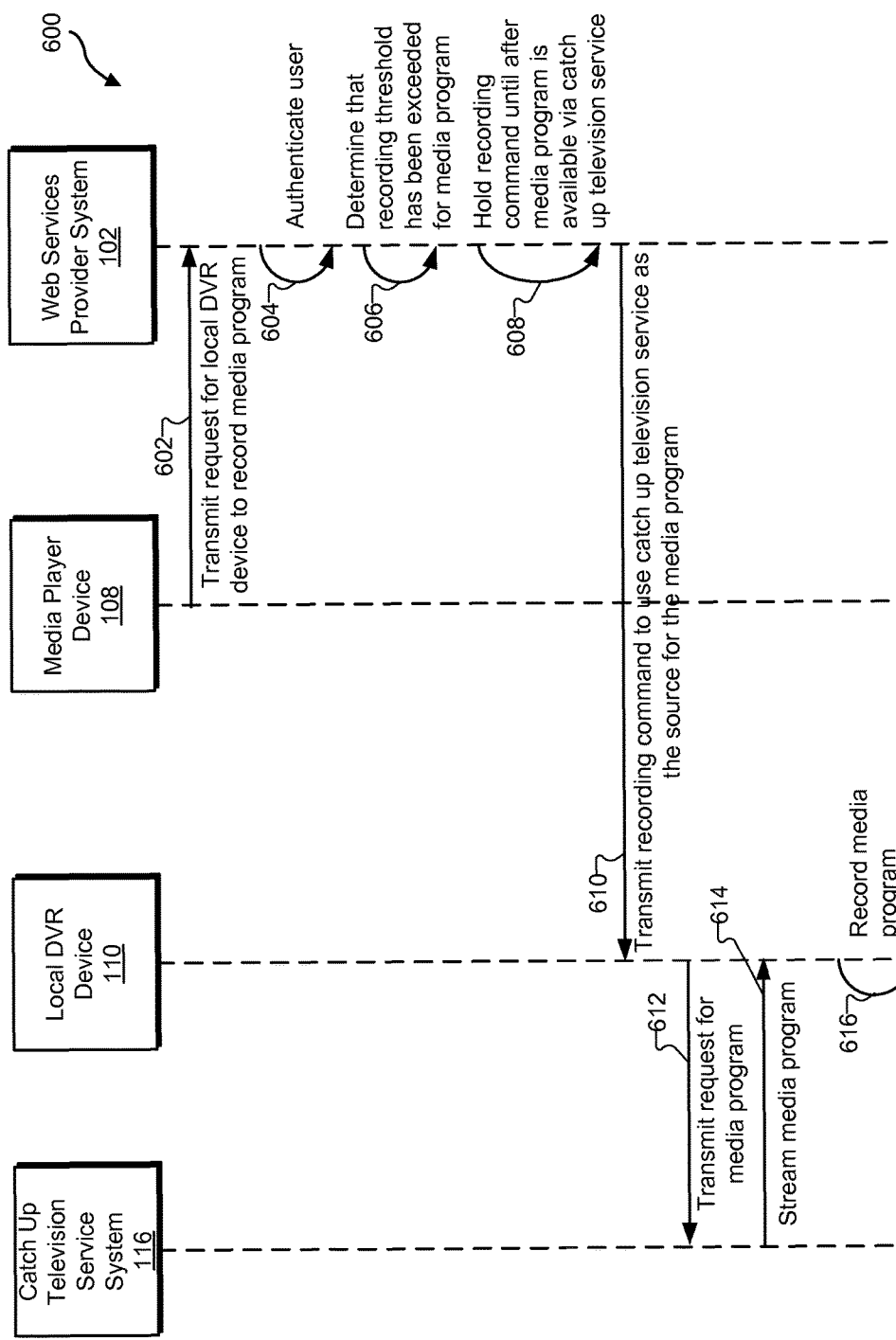

FIG. 6 shows an exemplary sequence diagram 600 that illustrates a scenario in which a user provides an input command representative of a request for local DVR device 110 included in local DVR system 104 to record a media program during a live transmission of the media program by a television service. As used herein, a "live transmission" of a media program means that the media program is being broadcast or otherwise provided by the television service prior to being made available by way of a catch up television service. For example, a live transmission of a media program may refer to a broadcast of a sporting event while the sporting event actually occurs. In this example, the request is received by media player device 108, which transmits the request to web services provider system 102 (step 602). It will be recognized that web services provider system 102 may alternatively detect the request in any other suitable manner.

In step 604, web services provider system 102 authenticates the user in response to receiving the request transmitted in step 602. Web services provider system 102 may authenticate the user in any of the ways described herein.

In step 606, web services provider system 102 determines that the media program is already being recorded during the live transmission of the media program by more than a predetermined threshold number of DVR devices when the input command is provided by the user. The predetermined threshold number may be set to be any suitable number as may serve a particular implementation.

Based on the determination that the media program is already being recorded during the live transmission of the media program by more than the predetermined threshold number of DVR devices, web services provider system 102 may determine that the optimal manner in which local DVR device 110 is to record the media program is for local DVR device 110 to abstain from recording the media program during the live transmission of the media program and instead use a catch up television service to record the media program subsequent to the live transmission. By directing local DVR device 110 to use the catch up television service to record the media program instead of recording the media program during the live transmission, web services provider system 102 may conserve bandwidth and system resources involved in directing a large number of local DVR devices to simultaneously receive and record the media program. For example, web services provider system 102 may conserve bandwidth and system resources involved in establishing notification service connections with each local DVR device that is to record the media program during the live transmission of the media program.

In step 608, web services provider system 102 holds the recording command until after the media program is available via the catch up television service. Once the media program is available via the catch up television service, web services provider system 102 transmits a recording command to local DVR device 110 for local DVR device 110 to use the catch up television service as the source for the media program (step 610). In response to receiving the recording command, local DVR device 110 transmits a request for the media program to catch up television service system 116 (step 612). In response to receiving the request for the media program from local DVR device 110, catch up television service system 116 streams the media program to local DVR device 110 (step 614). In step 616, local DVR device 616 records the media program included in the stream provided by catch up television service system 116. Steps 608-616 may be performed in any suitable manner.

Figure 7:
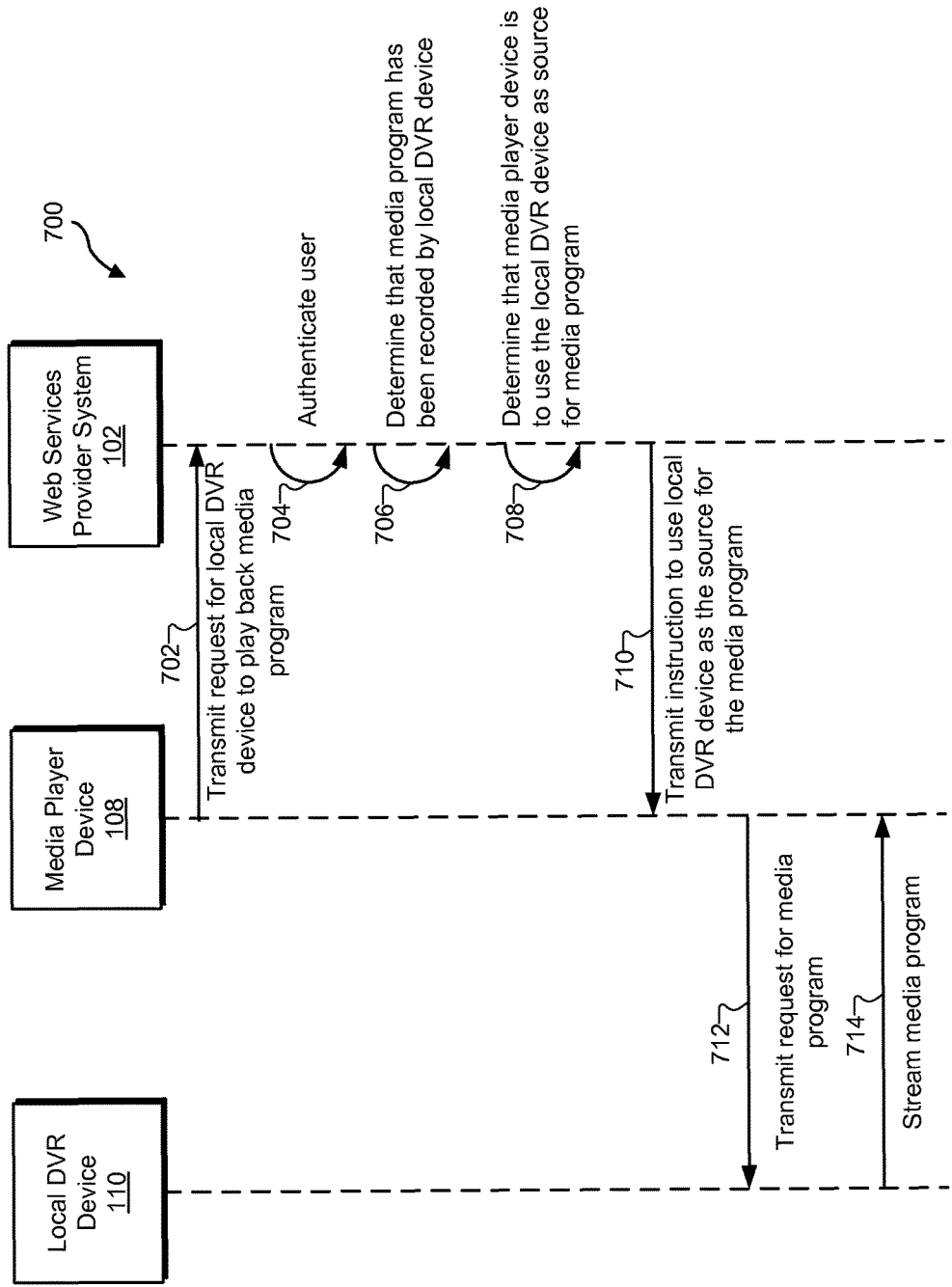

FIG. 7 shows an exemplary sequence diagram 700 that illustrates a scenario in which a user provides an input command representative of a request for media player device 108 to play back a media program subsequent to a previous request to record the media program. In this example, the request is received by media player device 108, which transmits the request to web services provider system 102 (step 702). It will be recognized that web services provider system 102 may alternatively detect the request in any other suitable manner.

In step 704, web services provider system 102 authenticates the user in response to receiving the request transmitted in step 702. Web services provider system 102 may authenticate the user in any of the ways described herein.

In step 706, web services provider system 102 determines that the media program has been recorded by local DVR device 110. Web services provider system 102 may make this determination in any suitable manner. For example, web services provider system 102 may determine that the media program has been recorded by local DVR device 110 by analyzing data stored by local DVR device 110 and/or metadata associated with the data stored by local DVR device 110.

In step 708, web services provider system 102 identifies an optimal manner in which to play back the media program by determining, based on the determination made in step 706, that media player device 108 is to use local DVR device 110 as a source for the media program. Step 708 may be performed in any suitable manner.

In step 710, web services provider system 102 transmits an instruction to media player device 108 for media player device 108 to use local DVR device 110 as the source for the media program. In other words, the instruction directs media player device 108 to play back the media program by receiving, from local DVR device 110, a media stream that includes the media program.

In step 712, media player device 108 transmits, in response to the instruction received from web services provider system 102, a request for the media program to local DVR device 110. In response to the request, local DVR device 110 provides a media stream that includes the media program to media player device 108 (step 714). Media player device 108 may play back the media program by receiving and processing the media stream.

Figure 8:
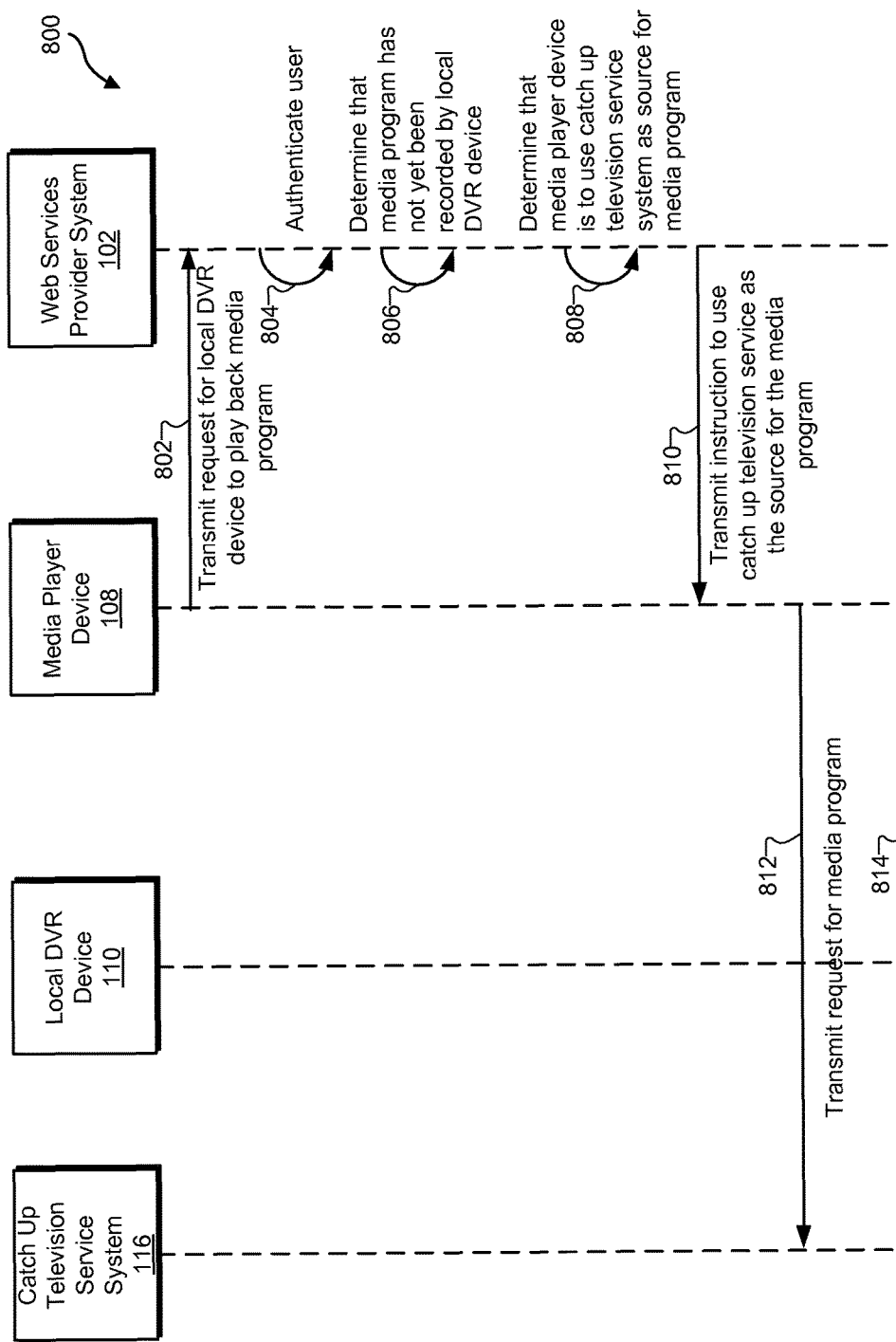

FIG. 8 shows another exemplary sequence diagram 800 that illustrates a scenario in which a user provides an input command representative of a request for media player device 108 to play back a media program subsequent to a previous request to record the media program. In this example, the request is received by media player device 108, which transmits the request to web services provider system 102 (step 802). It will be recognized that web services provider system 102 may alternatively detect the request in any other suitable manner.

In step 804, web services provider system 102 authenticates the user in response to receiving the request transmitted in step 802. Web services provider system 102 may authenticate the user in any of the ways described herein.

In step 806, web services provider system 102 determines that the media program has not yet been recorded by local DVR device 110 and that the media program is available from a catch up television service associated with catch up television service system 116. This scenario may occur when web services provider system 102 has instructed local DVR device 110 to abstain from recording the media program during a live transmission of the media program, when a recording conflict has prevented local DVR device 110 from recording at least a portion of the media program, when a network and/or power outage has prevented local DVR device 110 from recording at least a portion of the media program, and/or in any other scenario as may serve a particular implementation.

Web services provider system 102 may make the determination that local DVR device 110 has not yet recorded the media program in any suitable manner. For example, web services provider system 102 may determine that the media program has not yet been recorded by local DVR device 110 by analyzing data stored by local DVR device 110 and/or metadata associated with the data stored by local DVR device 110. Additionally or alternatively, web services provider system 102 may determine that the media program has not yet been recorded by local DVR device 110 by determining that local DVR device 110 has not yet started recording the media program or by determining that local DVR device 110 has only partially recorded the media program.

In step 808, web services provider system 102 identifies an optimal manner in which to play back the media program by determining, based on the determination made in step 806, that media player device 108 is to use catch up television service system 116 as a source for the media program. Step 808 may be performed in any suitable manner.

In step 810, web services provider system 102 transmits an instruction to media player device 108 for media player device 108 to use catch up television service system 116 as the source for the media program. In other words, the instruction directs media player device 108 to play back the media program by receiving, from catch up television service system 116, a media stream that includes the media program.

In step 812, media player device 108 transmits, in response to the instruction received from web services provider system 102, a request for the media program to catch up television service system 116. In response to the request, catch up television service system 116 provides a media stream that includes the media program to media player device 108 (step 814). Media player device 108 may play back the media program by receiving and processing the media stream.

In some examples, local DVR system 104 may include multiple local DVR devices. In these examples, web services provider system 102 may optimize the manner in which the multiple local DVR devices are utilized to record media programs. For example, in response to a user input command representative of a request to record a media program, web services provider system 102 may determine which local DVR device included in the multiple local DVR devices is to perform the recording. The determination may be based on available storage within each local DVR device, tuner availability of each local DVR device, and/or any other factor as may serve a particular implementation.

Figure 9:
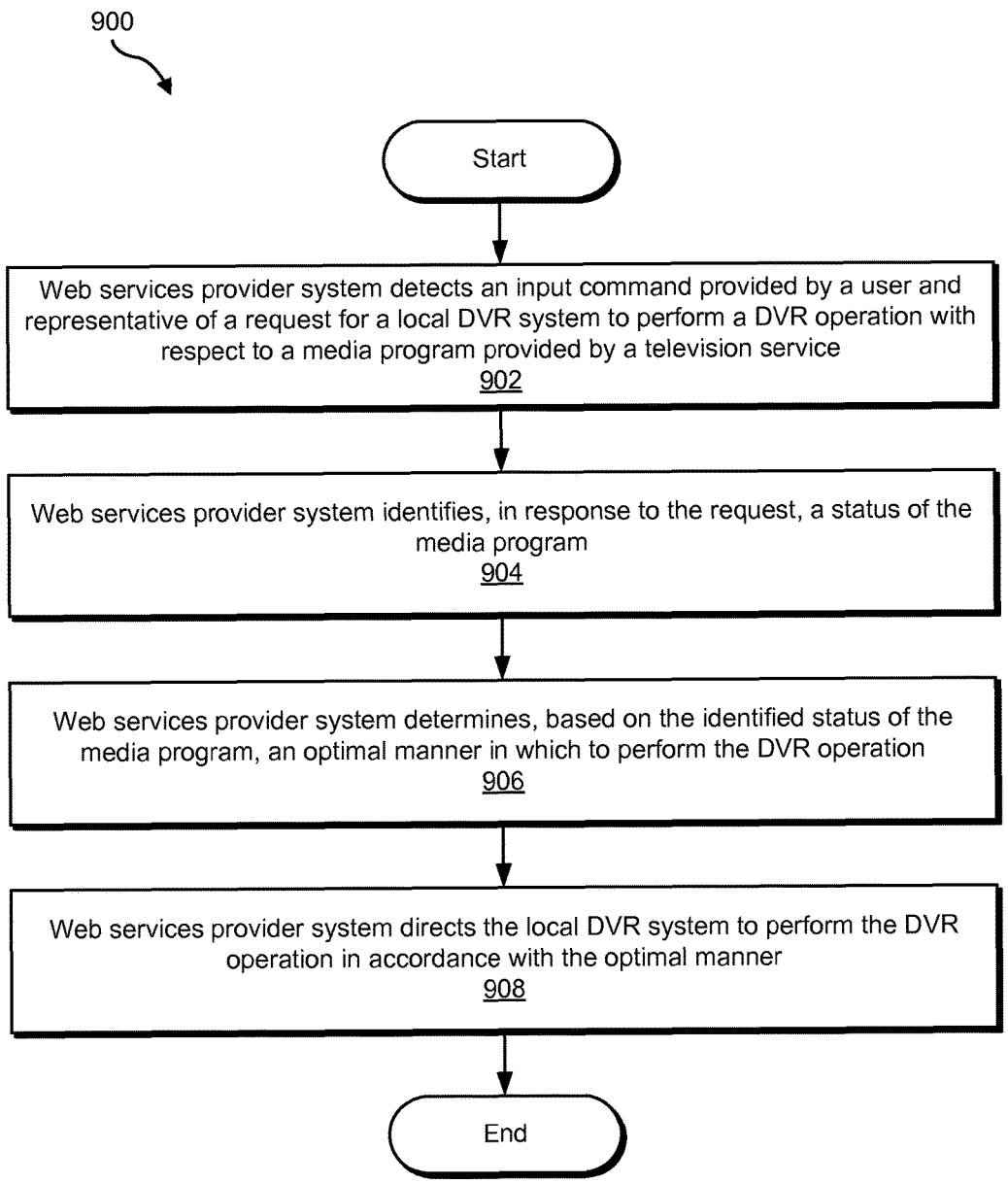
FIG. 9 illustrates an exemplary method for managing a local DVR system according to principles described herein.

FIG. 9 illustrates an exemplary method 900 for managing a local DVR system. While FIG. 9 illustrates exemplary steps according to one embodiment, other embodiments may omit, add to, reorder, and/or modify any of the steps shown in FIG. 9. One or more of the steps shown in FIG. 9 may be performed by web services provider system 102 and/or any implementation thereof.

In step 902, a web services provider system detects an input command provided by a user and representative of a request for a local DVR system to perform a DVR operation with respect to a media program provided by a television service. Step 902 may be performed in any of the ways described herein.

In step 904, the web services provider system identifies, in response to the request, a status of the media program. Step 904 may be performed in any of the ways described herein.

In step 906, the web services provider system determines, based on the identified status of the media program, an optimal manner in which to perform the DVR operation. Step 906 may be performed in any of the ways described herein.

In step 908, the web services provider system directs the local DVR system to perform the DVR operation in accordance with the optimal manner. Step 908 may be performed in any of the ways described herein.

Figure 10:
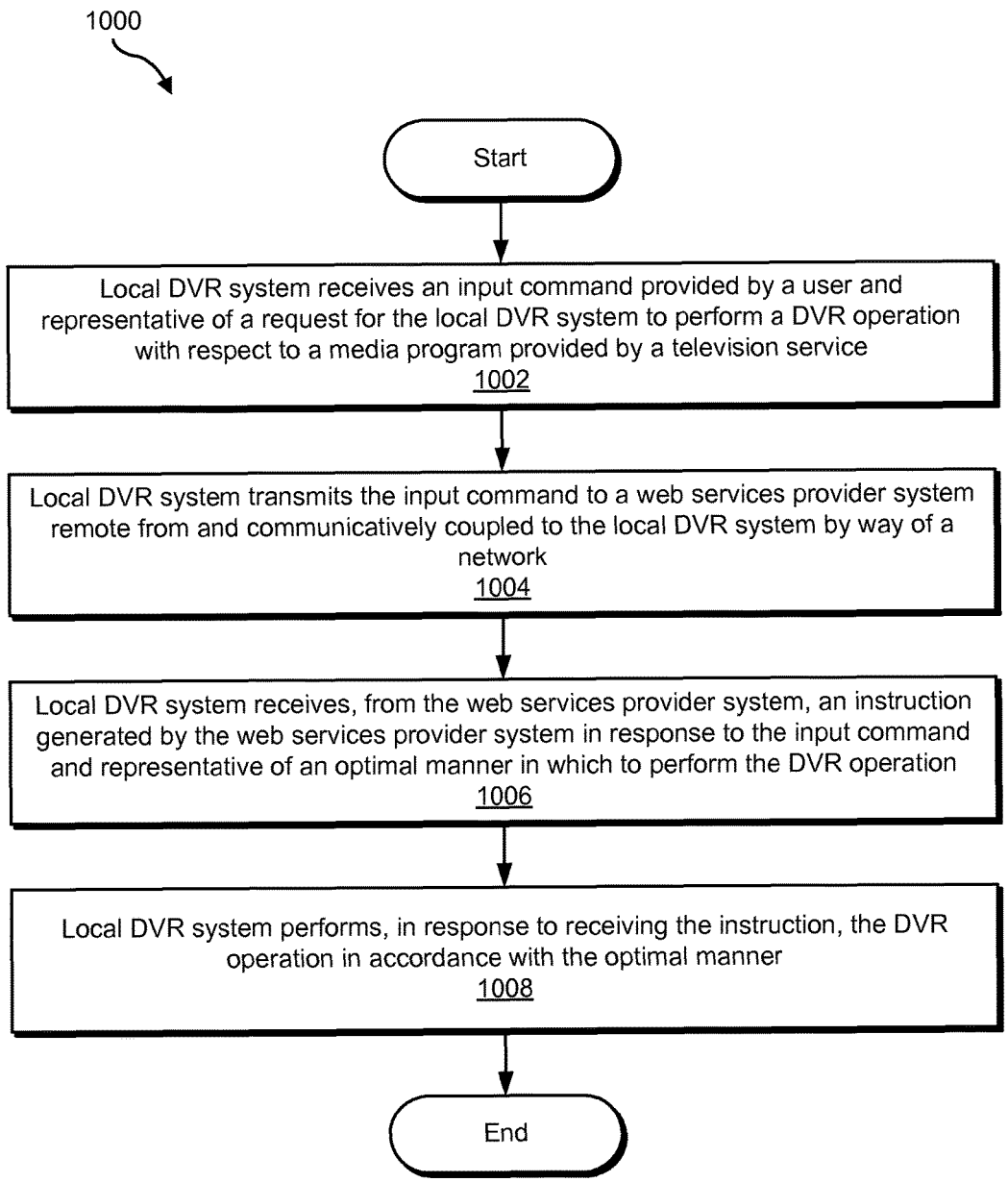
FIG. 10 illustrates an exemplary method of operation for a local DVR system according to principles described herein.

FIG. 10 illustrates an exemplary method 1000 of operation for a local DVR system. While FIG. 10 illustrates exemplary steps according to one embodiment, other embodiments may omit, add to, reorder, and/or modify any of the steps shown in FIG. 10. One or more of the steps shown in FIG. 10 may be performed by local DVR system 104 and/or any implementation thereof.

In step 1002, a local DVR system receives an input command provided by a user and representative of a request for the local DVR system to perform a DVR operation with respect to a media program provided by a television service. Step 1002 may be performed in any of the ways described herein.

In step 1004, the local DVR system transmits the input command to a web services provider system remote from and communicatively coupled to the local DVR system by way of a network. Step 1004 may be performed in any of the ways described herein.

In step 1006, the local DVR system receives, from the web services provider system, an instruction generated by the web services provider system in response to the input command and representative of an optimal manner in which to perform the DVR operation. Step 1006 may be performed in any of the ways described herein.

In step 1008, the local DVR system performs, in response to receiving the instruction, the DVR operation in accordance with the optimal manner. Step 1008 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), erasable programmable read-only memory ("EPROM"), electrically erasable programmable read-only memory ("EEPROM"), a Flash EEPROM device, any other memory chip or cartridge, or any other tangible medium from which a computer can read.

Figure 11:
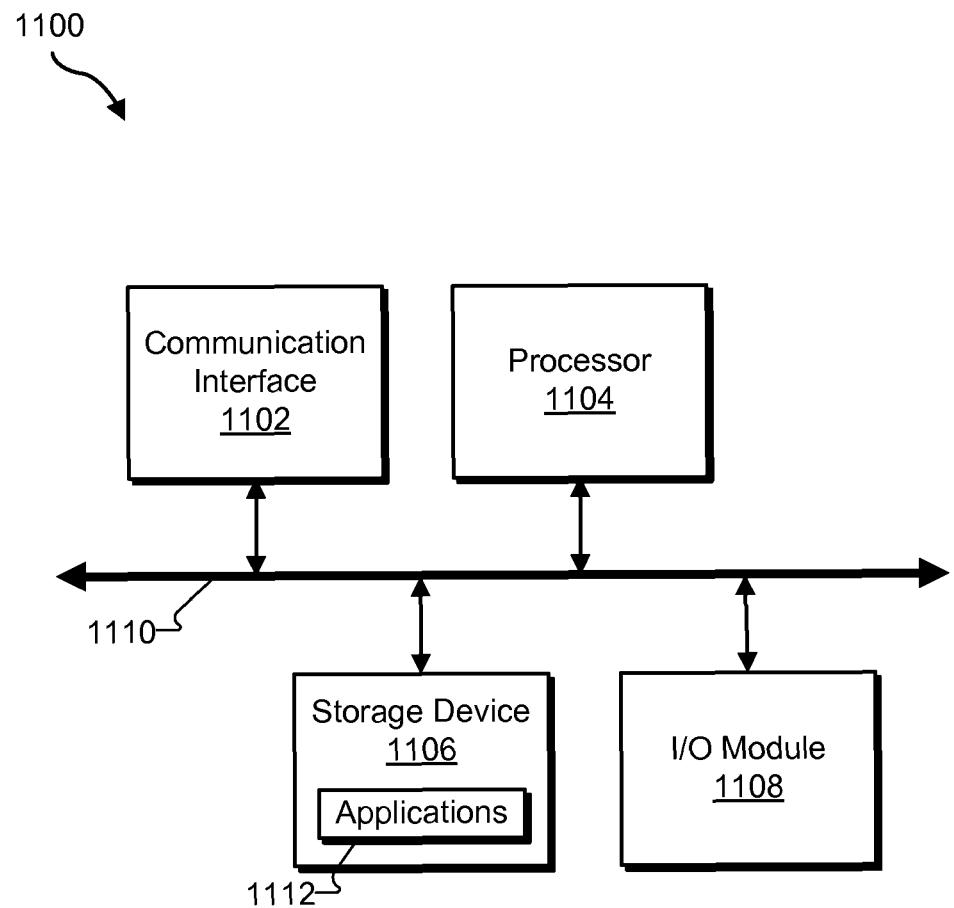
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 202 and DVR management facility 204. Likewise, storage facility 206 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a web services provider system remote from and communicatively coupled to a local digital video recording ("DVR") system by way of a network, an input command provided by a user and representative of a request for the local DVR system to record a media program during a live transmission of the media program by a television service, the local DVR system comprising a media player device and a local DVR device separate from and communicatively coupled to the media player device;
    determining, by the web services provider system in response to the request, that the media program is already being recorded during the live transmission of the media program by more than a predetermined threshold number of DVR devices when the input command is provided by the user;

determining, by the web services provider system based on the determining that the media program is already being recorded by more than the predetermined threshold number of DVR devices, that the local DVR device is to abstain from recording the media program during the live transmission of the media program and instead utilize a catch up television service to record the media program subsequent to the live transmission; and transmitting, by the web services provider system, a recording command to the local DVR device to begin recording, subsequent to the live transmission, a media stream that includes the media program and that is provided by the catch up television service.

2. The method of claim 1, further comprising:

detecting, by the web services provider system, an additional input command provided by the user and representative of an additional request for the local DVR system to record an additional media program provided by the television service;

determining, by the web services provider system, that an additional media stream that includes the additional media program is available to the local DVR system when the additional input command is provided by the user;

determining, by the web services provider system based on the determining that the additional media stream is available to the local DVR system when the additional input command is provided by the user, that the local DVR device is to begin recording the additional media program in response to the additional input command being provided by the user; and transmitting, by the web services provider system in response to and within a predetermined time period of determining that the local DVR device is to begin recording the additional media program in response to the additional input command being provided by the user, an additional recording command to the local DVR device for the local DVR device to begin receiving and recording the additional media stream.

3. The method of claim 1, further comprising:

detecting, by the web services provider system, an additional input command provided by the user and representative of an additional request for the local DVR system to record an additional media program provided by the television service;

determining, by the web services provider system, that an additional media stream that includes the additional media program will not be available to the local DVR system until a scheduled time that is subsequent to the additional input command being provided by the user;

determining, by the web services provider system based on the determining that the additional media stream will not be available to the local DVR system until the scheduled time, that the local DVR device is to wait until the scheduled time to begin recording the additional media program; and waiting, by the web services provider system, to transmit an additional recording command associated with the additional media program to the local DVR device until a point in time that temporally precedes and is within a predetermined amount of time of the scheduled time.

4. The method of claim 3, further comprising:

detecting, by the web services provider system while waiting to transmit the additional recording command to the local DVR device, a change in a status of the additional media program; and modifying, by the web services provider system in response to the detecting of the change in the status, the additional recording command to reflect the change in the status prior to additional the recording command being transmitted to the local DVR device.

5. The method of claim 4, wherein:

the detecting of the change in the status of the additional media program comprises determining that recording the additional media program beginning at the scheduled time will conflict with a scheduled recording of a second additional media program; and the modifying of the additional recording command comprises identifying a different time that the additional media program will be available to the local DVR device and that does not conflict with the scheduled recording of the second additional media program, and updating the additional recording command with data that directs the local DVR device to begin recording the additional media program at the different time.

6. The method of claim 4, wherein:

the detecting of the change in the status of the additional media program comprises detecting a change in the scheduled time; and the modifying of the recording command comprises updating the additional recording command with data that directs the local DVR device to begin recording the additional media program at the changed scheduled time.

7. The method of claim 1, further comprising:

detecting, by the web services provider system, an additional input command provided by the user and representative of an additional request for the media player device to play back an additional media program subsequent to a previous request to record an additional media program;

determining, by the web services provider system, that the additional media program has been recorded by the local DVR device;

determining, by the web services provider system in response to the determining that the additional media program has been recorded by the local DVR device, that the media player device is to use the local DVR device as a source for the additional media program; and directing, by the web services provider system, the media player device to play back the additional media program by receiving, from the local DVR device, an additional media stream that includes the additional media program.

8. The method of claim 1, further comprising:

detecting, by the web services provider system, an additional input command provided by the user and representative of an additional request for the media player device to play back an additional media program subsequent to a previous request to record the additional media program;

determining, by the web services provider system, that the additional media program has not yet been recorded by the local DVR device and that the additional media program is available from the catch up television service;

determining, by the web services provider system in response to the determining that the additional media program has not yet been recorded by the local DVR device and that the additional media program is available from the catch up television service, that the media player device is to use the catch up television service as a source for the additional media program; and directing, by the web services provider system, the media player device to play back the additional media program by receiving, from a catch up television service provider system associated with the catch up television service, an additional media stream that includes the additional media program.

9. The method of claim 1, further comprising:

determining, by the web services provider system in response to the request, that the user is authorized to interact with the local DVR system;

wherein the transmitting of the recording command is performed in response to the determining that the user is authorized to interact with the local DVR system.

10. The method of claim 1, embodied as computer-executable instructions on at least one non-transitory computer-readable medium.

11. A method comprising:

receiving, by a local digital video recording ("DVR") system that comprises a media player device and a local DVR device separate from and communicatively coupled to the media player device, an input command provided by a user and representative of a request for the local DVR system to record a media program during a live transmission of the media program by a television service;

transmitting, by the local DVR system, the input command to a web services provider system remote from and communicatively coupled to the local DVR system by way of a network, wherein the web services provider system determines that the local DVR device is to abstain from recording the media program during the live transmission of the media program and instead utilize a catch up television service to record the media program subsequent to the live transmission;

receiving, by the local DVR system from the web services provider system, a recording command for the DVR device to begin recording, subsequent to the live transmission, a media stream that includes the media program and that is provided by the catch up television service; and recording, by the local DVR system in response to receiving the recording command, the media stream provided by the catch up television service.

12. The method of claim 11, wherein:

receiving, by the local DVR system, an additional input command representative of an additional request for the local DVR device to record an additional media program;

transmitting, by the local DVR system, the additional input command to the web services provider system;

receiving, by the local DVR system, an additional recording command for the local DVR device to begin receiving and recording an additional media stream that includes the additional media program in response to the additional input command being provided by the user; and receiving and recording, by the local DVR device in response to receiving the additional recording command, the additional media stream.

13. The method of claim 11, wherein:

receiving, by the local DVR system, an additional input command representative of an additional request for the media player device to play back an additional media program subsequent to a previous request to record the additional media program;

transmitting, by the local DVR system, the additional input command to the web services provider system;

receiving, by the local DVR system, a command for the media player device to use a catch up television service as a source for the additional media program; and directing, by the local DVR system in accordance with the command, the media player device to receive, from a catch up television service provider system associated with the catch up television service, an additional media stream that includes the additional media program.

14. The method of claim 11, embodied as computer-executable instructions on at least one non-transitory computer-readable medium.

15. A system remote from and communicatively coupled to a local digital video recording ("DVR") system by way of a network, the system comprising:

at least one physical computing device that:

detects an input command provided by a user and representative of a request for the local DVR system to record a media program during a live transmission of the media program by a television service, the local DVR system comprising a media player device and a local DVR device separate from and communicatively coupled to the media player device;

determines, in response to the request, that the media program is already being recorded during the live transmission of the media program by more than a predetermined threshold number of DVR devices when the input command is provided by the user;

determines, based on the determination that the media program is already being recorded by more than the predetermined threshold number of DVR devices, that the local DVR device is to abstain from recording the media program during the live transmission of the media program and instead utilize a catch up television service to record the media program subsequent to the live transmission; and transmits a recording command to the local DVR device to begin recording, subsequent to the live transmission, a media stream that includes the media program and that is provided by the catch up television service.

16. The system of claim 15, wherein:

the at least one physical computing device detects an additional input command provided by the user and representative of an additional request for the local DVR system to record an additional media program provided by the television service;

determines that an additional media stream that includes the additional media program is available to the local DVR system when the additional input command is provided by the user;

determines, based on the determination that the additional media stream is available to the local DVR system when the additional input command is provided by the user, that the local DVR device is to begin recording the additional media program in response to the additional input command being provided by the user; and transmits, in response to and within a predetermined time period of determining that the local DVR device is to begin recording the additional media program in response to the additional input command being provided by the user, an additional recording command to the local DVR device for the local DVR device to begin receiving and recording the additional media stream.

17. The system of claim 15, wherein:
the at least one physical computing device
   detects an additional input command provided by the user and representative of an additional request for the local DVR system to record an additional media program provided by the television service;
   determines that an additional media stream that includes the additional media program will not be available to the local DVR system until a scheduled time that is subsequent to the additional input command being provided by the user;
   determines, based on the determination that the media stream will not be available to the local DVR system until the scheduled time, that the local DVR device is to wait until the scheduled time to begin recording the additional media program; and
   waits to transmit a recording command associated with the additional media program to the local DVR device until a point in time that temporally precedes and is within a predetermined amount of time of the scheduled time.

18. The system of claim 17, wherein the at least one physical computing device
   detects, while waiting to transmit the additional recording command to the local DVR device, a change in a status of the additional media program; and
   modifies, in response to the detection of the change in the status, the additional recording command to reflect the change in the status prior to additional the recording command being transmitted to the local DVR device.

19. The system of claim 18, wherein the at least one physical computing device
   detects the change in the status of the additional media program by determining that recording the additional media program beginning at the scheduled time will conflict with a scheduled recording of a second additional media program; and
   modifies the additional recording command by
      identifying a different time that the additional media program will be available to the local DVR device and that does not conflict with the scheduled recording of the second additional media program, and
      updating the additional recording command with data that directs the local DVR device to begin recording the additional media program at the different time.

20. The system of claim 15, wherein:
the at least one physical computing device
   detects an additional input command provided by the user and representative of an additional request for the media player device to play back an additional media program subsequent to a previous request to record an additional media program;
   determines that the additional media program has not yet been recorded by the local DVR device and that the media program is available from a catch up television service;
   determines, in response to the determination that the additional media program has not yet been recorded by the local DVR device and that the additional media program is available from the catch up television service, that the media player device is to use the catch up television service as a source for the additional media program; and
   directs the media player device to play back the additional media program by receiving, from a catch up television service provider system associated with the catch up television service, an additional media stream that includes the media program.

\* \* \* \* \*